(12) United States Patent
Kollenkark et al.

(10) Patent No.: US 9,124,651 B2
(45) Date of Patent: Sep. 1, 2015

(54) CONTROLLING MEDIA CONSUMPTION PRIVACY SETTINGS

(75) Inventors: Sean Kollenkark, Seattle, WA (US); Chad Gibson, Seattle, WA (US); Clifton James Hebert, Redmond, WA (US); Cory Cirrincione, Bellevue, WA (US); Doug Berrett, Seattle, WA (US); Joe McClanahan, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 87 days.

(21) Appl. No.: 12/749,887

(22) Filed: Mar. 30, 2010

(65) Prior Publication Data
US 2011/0246572 A1 Oct. 6, 2011

(51) Int. Cl.
*G06F 15/16* (2006.01)
*H04L 29/08* (2006.01)
*H04N 21/475* (2011.01)
*H04N 21/4788* (2011.01)
(Continued)

(52) U.S. Cl.
CPC .......... *H04L 67/306* (2013.01); *H04N 21/4755* (2013.01); *H04N 21/4788* (2013.01); *H04N 21/4826* (2013.01)

(58) Field of Classification Search
CPC ... G06Q 10/10; H04L 29/06; H04L 29/08072
USPC ........................................................ 709/204
See application file for complete search history.

(56) References Cited

U.S. PATENT DOCUMENTS

| 5,223,924 | A | 6/1993 | Strubbe |
| 5,977,964 | A | 11/1999 | Williams et al. |
| 6,611,881 | B1 | 8/2003 | Gottfurcht et al. |

(Continued)

FOREIGN PATENT DOCUMENTS

| CN | 1605201 A | 4/2005 |
| CN | 101431483 A | 5/2009 |
| WO | 2005008356 A2 | 1/2005 |

OTHER PUBLICATIONS

Shin, et al., "Personalized Digital TV Content Recommendation with Integration of User Behavior Profiling and Multimodal Content Rating", Retrieved at<<http://ieeexplore.ieee.org/stamp/stamp.jsp?arnumber=05278008>>, 2009, pp. 1417-1423.

(Continued)

*Primary Examiner* — Chris Parry
*Assistant Examiner* — Alan S Chou
(74) *Attorney, Agent, or Firm* — Micah Goldsmith; Judy Yee; Micky Minhas

(57) ABSTRACT

Embodiments related to controlling media privacy settings are disclosed. One disclosed embodiment provides a media server system including a configured to receive media consumption data for each media content item of a plurality of media content items consumed by a user. Media consumption data for each media content item includes an item-specific privacy status and a media content item identifier. The server is also configured to receive, from one or more of another user and a media content item recommendations program, a request for access to the media consumption data for a media content item, and to provide one or more of the other user and the media content item recommendations program with access to the media consumption data based on the item-specific privacy status of the media consumption data.

17 Claims, 7 Drawing Sheets

(51) Int. Cl.
*H04N 21/482* (2011.01)
*G06F 13/00* (2006.01)

(56) References Cited

U.S. PATENT DOCUMENTS

| | | | |
|---|---|---|---|
| 6,934,964 | B1 | 8/2005 | Schaffer et al. |
| 6,973,621 | B2 | 12/2005 | Sie et al. |
| 7,434,244 | B2 | 10/2008 | Popov et al. |
| 2004/0155962 | A1 | 8/2004 | Marks |
| 2005/0022239 | A1* | 1/2005 | Meuleman ............... 725/46 |
| 2005/0132420 | A1 | 6/2005 | Howard et al. |
| 2007/0220553 | A1 | 9/2007 | Branam et al. |
| 2007/0244984 | A1* | 10/2007 | Svendsen ............... 709/217 |
| 2007/0266403 | A1 | 11/2007 | Ou et al. |
| 2009/0216859 | A1* | 8/2009 | Dolling ............... 709/218 |
| 2011/0214148 | A1* | 9/2011 | Gossweiler et al. ............ 725/46 |

OTHER PUBLICATIONS

The State Intellectual Property Office of the People's Republic of China, Notice on the First Office Action of Chinese Patent Application No. 201110087014.8, Apr. 2, 2013, 12 pages.

State Intellectual Property Office of the People's Republic of China, Second Office Action Received in China Patent Application No. 201110087014.8, Dec. 10, 2013, 6 Pages.

State Intellectual Property Office of the People's Republic of China, Third Office Action and Search Report Received in China Patent Application No. 201110087014.8, May 6, 2014, 11 Pages.

State Intellectual Property Office of the People's Republic of China, Fourth Office Action Received in China Patent Application No. 201110087014.8, Aug. 18, 2014, 6 Pages.

* cited by examiner

US 9,124,651 B2

CONTROLLING MEDIA CONSUMPTION PRIVACY SETTINGS

BACKGROUND

Network-based media services, such as internet television services and other streaming media services, may store a user profile for each user of the media service. Various settings related to media consumption and user privacy may be stored in a user's profile and adjusted by accessing the profile. For example, a user may be able to choose whether to share information related to any media content consumed by the user with other users in a social network. Such privacy settings generally apply to all media content consumed while the settings are active, and may be adjusted by accessing the user profile via a menu system.

User profiles also may be affected by activities carried out by a user while the user is consuming media (e.g., watching television, listening to music). For example, a media consumption history stored in a user's profile may affect recommendations of other media content items generated by the media server for that user. By using the user's activities to personalize the user profile, a user may avoid having to manually provide these user profile settings.

SUMMARY

Various embodiments related to the control of privacy settings in a media consumption experience are described herein. For example, in one disclosed embodiment, an example media server system for generating media content item recommendations includes a logic subsystem, and a data-holding subsystem holding instructions executable by the logic subsystem to receive media consumption data for each media content item of a plurality of media content items consumed by a user. Media consumption data for each media content item includes an item-specific privacy status and a media content item identifier. The data-holding subsystem holds further instructions executable to receive, from one or more of another user and a media content item recommendations program, a request for access to the media consumption data for a media content item, and to provide one or more of the other user and the media content item recommendations program with access to the media consumption data for the media content item based on the item-specific privacy status of the media consumption data for the media content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
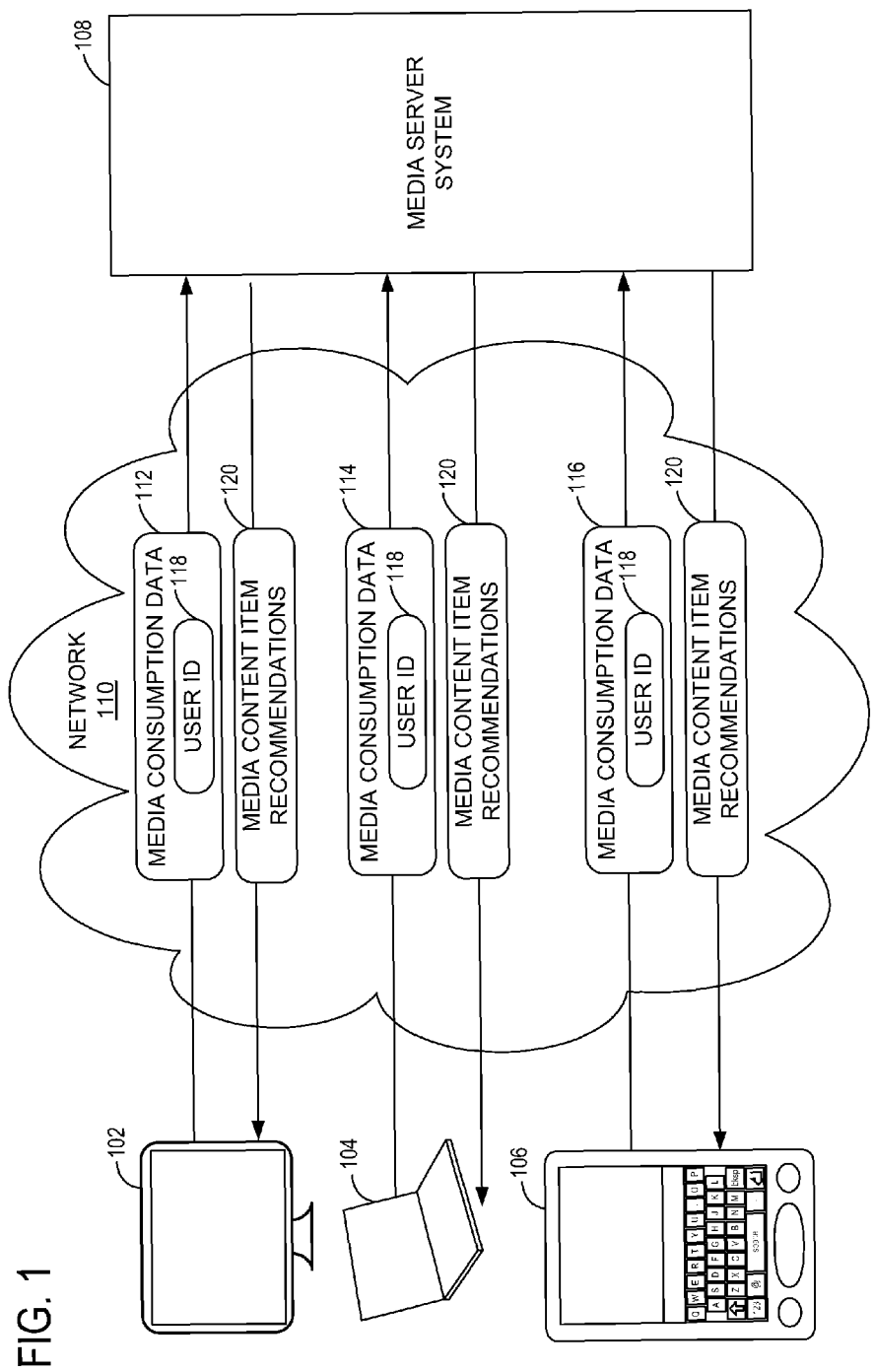
FIG. 1 shows a schematic view of an embodiment of a system for communicating media information between clients and a server system.

As mentioned above, a user consumes media (e.g., watches television, watches movies, listens to music, etc.) via a media client, information regarding the user's media consumption may be sent by the client to a server system, where it may be used at the server system to personalize a user's profile, or to influence future media recommendations for the user. As one nonlimiting example, while a user is watching a television show, a media client sends information regarding consumption of the television show to a server system. This information may be used, for example, in selecting recommendations of other media content items for the user. Further, in some use environments, other members of the user's social network can view information regarding the media content items consumed by the user.

However, in some situations, a user may not want certain media content items to be used in the generation of recommendations, and/or may want to keep the consumption of certain media content items private from other users. For example, where a child uses a parent's user account to view media content items, a parent may not want content consumed by the child (e.g. cartoons) to be used to generate recommendations for the parent. Likewise, the parent may not wish for other users in his or her social network to see the media content items consumed by the child.

However, adjusting such privacy settings in a user profile may involve several steps, such as opening a menu system and browsing through the menu to find the location in the menu at which privacy settings can be changed. Further, viewing current privacy settings may involve the same or similarly cumbersome process.

Therefore, various embodiments are disclosed herein that relate to the control of media privacy settings such that a user can easily view and change a privacy status. In some embodiments, the privacy status is an item-specific privacy status. For example, as described in more detail below, a user may assign a sharing status, such as a private or non-private sharing status, to a consumed media content item (e.g., television show, movie, videoconference, song, podcast, etc.) such that the sharing status is associated with the media content item, rather than with a user profile. This sharing status is included in information sent to the server system. Thus, referring to the television example provided above, this feature allows a user to set a non-private sharing status for a television show that the user would like other users to know that the user is watching, or has previously watched. This feature also allows the user to set a private sharing status for television shows that the user would not like other users to know that the user is watching or has previously watched, thereby hiding the consumption of the television show from other users.

As described in more detail below, an item-specific privacy status additionally or alternatively may include a recommendations status, such as a "true" or "false" recommendations status. This status allows a user to selectively indicate which consumed media content items influence future media content item recommendations. In the television example, a current television show will be used as a basis upon which future media recommendations are generated if the current television has a "true" recommendations status. Likewise, if the current television show has a "false" recommendations status, then it will not be included as a basis upon which future media recommendations are generated.

In some embodiments, a user may retroactively change a privacy status (e.g., a sharing status, a recommendations status) of a previously consumed media content item. Further, in some embodiments, a media server system may predict a privacy status for future media items consumed by a user based on the user's media consumption history stored at the server system.

FIG. 1 shows a schematic view of an example system for communicating media consumption data. Any number and type of devices, such as a television 102, laptop 104, and mobile phone 106, may communicate with a media server system 108. The television 102 sends media consumption data 112 consumed via the television 102, the laptop 104 sends media consumption data 114 consumed via the laptop 104, and the mobile phone 106 sends media consumption data 116 consumed via the mobile phone 106 to the media server system 108.

In this example, a same user consumes media content items via each of the television 102, laptop 104, and mobile phone 106. As such, each of media consumption data 112, media consumption data 114, and media consumption data 116 are associated with user identifier 118 by the respective devices reporting the media consumption data. User identifier 118 may be any type of data or combination of data representative of the user's identity, including but not limited to an identification code, user name, password, etc.

The media consumption data 112 from the television 102, the media consumption data 114 from the laptop 104, and the media consumption data 116 from the mobile phone 106 are aggregated and stored at the media server system 108 in association with a same user identifier 118. In this way, media consumption data regarding media content items consumed in association with a user represented by user identifier 118 can be reliably tracked regardless of a source (e.g., media provider) of the consumed media content items, or a device by which the user consumes media content items.

At times, a second user may consume media via the television 102, laptop 104, and/or mobile phone 106. In order to ensure that media consumption by a first user is associated with a first user identifier and that media consumption by the second user is associated with a second user identifier, users of devices communicating with the media server system 108 may be asked to provide a user log-in in order to consume media content items and/or in order to track media consumption, as just one example. Alternately, users other than a majority, or default, user may be allowed to log in as a guest in order to consume media content items. By allowing the second user to log in as a guest, ensuing media consumption can be associated with a guest identifier, thereby avoiding an inappropriate association of the ensuing media consumption data with the first user identifier. Further, as described in more detail below, a user may retroactively change the sharing and/or recommendation status of any such items viewed by others.

Media content item recommendations output by media server are indicated at 120. In some embodiments, the same media content item recommendations 120 may be output to the user's television 102, the laptop 104, and the mobile phone 106. However, in other cases, different media content item recommendations may be output to different devices, for example, based on a time at which the media content item recommendations are generated, or based on a type of media content items that are viewable on each of the devices. It is to be understood that different media content item recommendations may be sent to different users based on each user's media consumption data.

Figure 2:
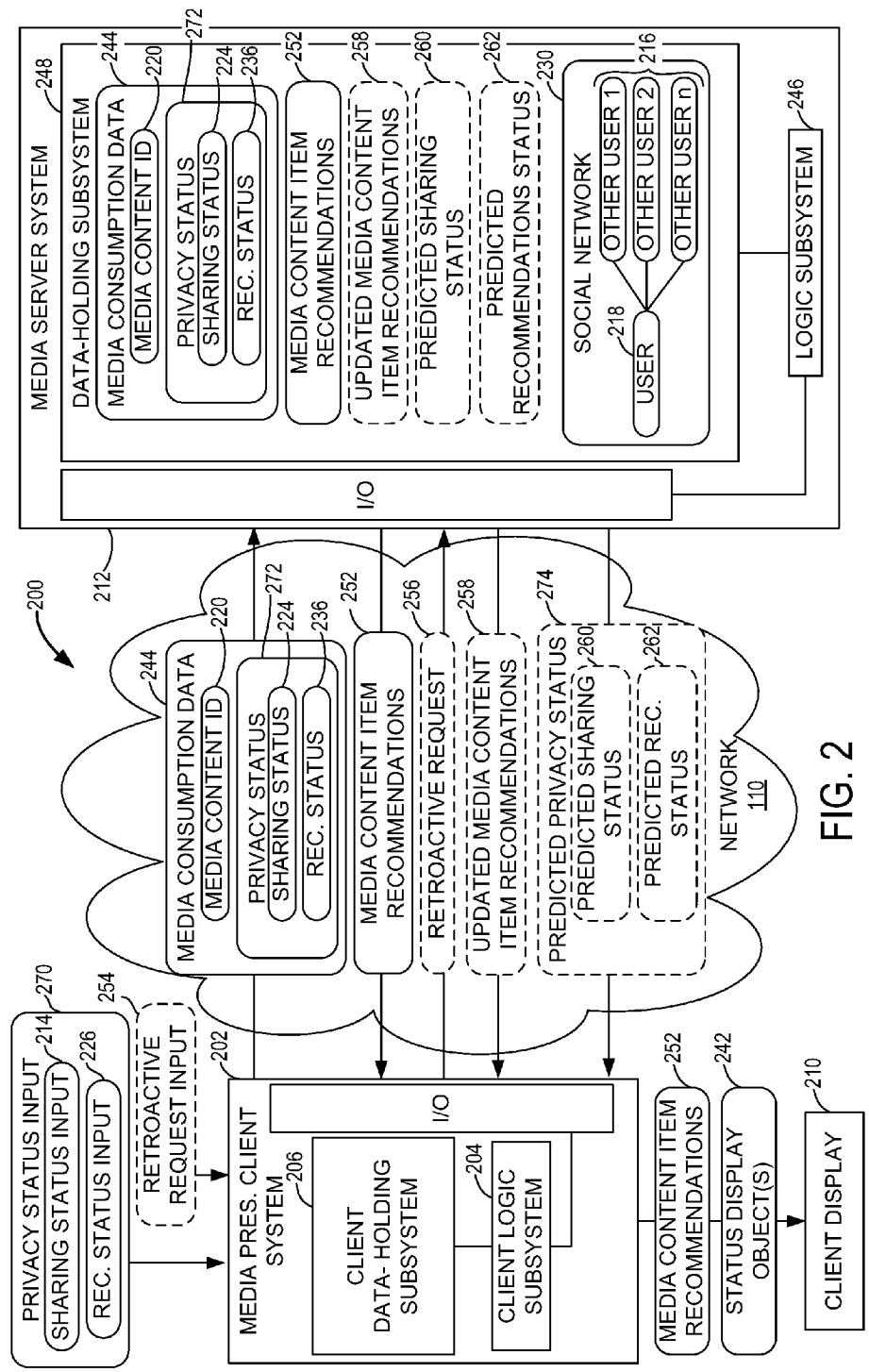
FIG. 2 shows a schematic view of an embodiment of a system for generating media content item recommendations.

FIG. 2 shows a schematic view of an embodiment of a system 200 for generating media content item recommendations. A media presentation client system 202 includes a client logic subsystem 204 and a client data-holding subsystem 206 holding instructions executable by client logic subsystem 204 to output a media content item (e.g., video file, video streaming, audio file, audio streaming, etc.) for presentation via a client display 210. Although not shown, it will be understood that the media content item may be received at the media presentation client system 202 from the media server system 212 or a third party media provider (not shown).

As described above, the media presentation client system 202 is configured to receive from a user a privacy status input 270. The privacy status input 270 may include a sharing status input 214 indicating a sharing status 224 that is of one of a private sharing status and a non-private sharing status for a media content item. As discussed in more detail with respect to FIG. 3, the sharing status 224 indicates whether information regarding consumption of a media content item can be shared with other users of the media server system 212, and/or other users 216 connected to a user 218 in a social network 230.

The privacy status input 270 may additionally or alternatively include a recommendations status input 226 indicating a recommendations status 236 including one of a "true" recommendations status and "false" recommendations status. As discussed in more detail with respect to FIG. 3, the recommendations status 236 indicates whether the media content item is useable to generate media content item recommendations.

The media presentation client system 202 may further be configured to output one or more status display objects 242 representative of the privacy status 272 to the client display 210. That is, the one or more status display objects 242 may represent one or more of the sharing status 224 and the recommendations status 236 so that a user is presented with visual feedback regarding changes made to the sharing status 224 and/or recommendations status 236, for example. An example of status display objects is shown and described with respect to FIG. 4A-4D.

The media consumption data 244 output by the media presentation client system 202 to the server system is shown as including a media content item identifier 220 representative of the media content item consumed by the user, and the privacy status 272, which includes the sharing status 224 and/or the recommendations status 236. It will be understood that any suitable set of media consumption data 244 may be sent to the media server system 212.

The media server system 212 includes a logic subsystem 246 to execute instructions, and a data-holding subsystem 248 holding instructions executable by the logic subsystem 246 to aggregate media consumption data received from clients. The instructions may further be executable to generate media content item recommendations 252 based on the media consumption data for each media content item, and/or to receive and respond to requests from other users to view a user's media consumption data. It will be understood that programs for executing these functionalities may be stored and executed locally on media server system 212, or may be stored and executed on remote systems in communication with media server system 212.

The logic subsystem 246 of media server system 212 may include one or more physical devices configured to execute one or more instructions. For example, the logic subsystem 246 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result, including but not limited to performing the embodiments described herein. The logic subsystem 246 may include one or more processors that are configured to execute software instructions. Additionally or alternatively, the logic subsystem 246 may include one or more hardware or firmware logic machines configured to execute hardware or firmware instructions. The logic subsystem 246 may optionally include individual components that are distributed throughout two or more devices, which may be remotely located in some embodiments.

Data-holding subsystem 248 may include one or more physical, non-transitory, devices configured to hold data and/or instructions executable by the logic subsystem to implement the herein described methods and processes. When such methods and processes are implemented, the state of data-holding subsystem 248 may be transformed (e.g., to hold different data). Data-holding subsystem 248 may include removable storage media and/or built-in devices. Data-holding subsystem 248 may include optical memory devices, semiconductor memory devices, and/or magnetic memory devices, among others. Data-holding subsystem 248 may include devices with one or more of the following characteristics: volatile, nonvolatile, dynamic, static, read/write, read-only, random access, sequential access, location addressable, file addressable, and content addressable. In some embodiments, logic subsystem 246 and data-holding subsystem 248 may be integrated into one or more common devices, such as an application specific integrated circuit or a system on a chip.

Although not shown in FIG. 2, an aspect of the data-holding subsystem 248 may be in the form of computer-readable removable media, which may be used to store and/or transfer data and/or instructions executable to implement the herein described methods and processes.

FIGS. 3-7 illustrate embodiments of methods for controlling media privacy settings. It will be understood that the methods and processes that are described herein with respect to FIGS. 3-7 may be executed by one or more computing systems, such as the media server system 212 illustrated in FIG. 2.

Figure 3:
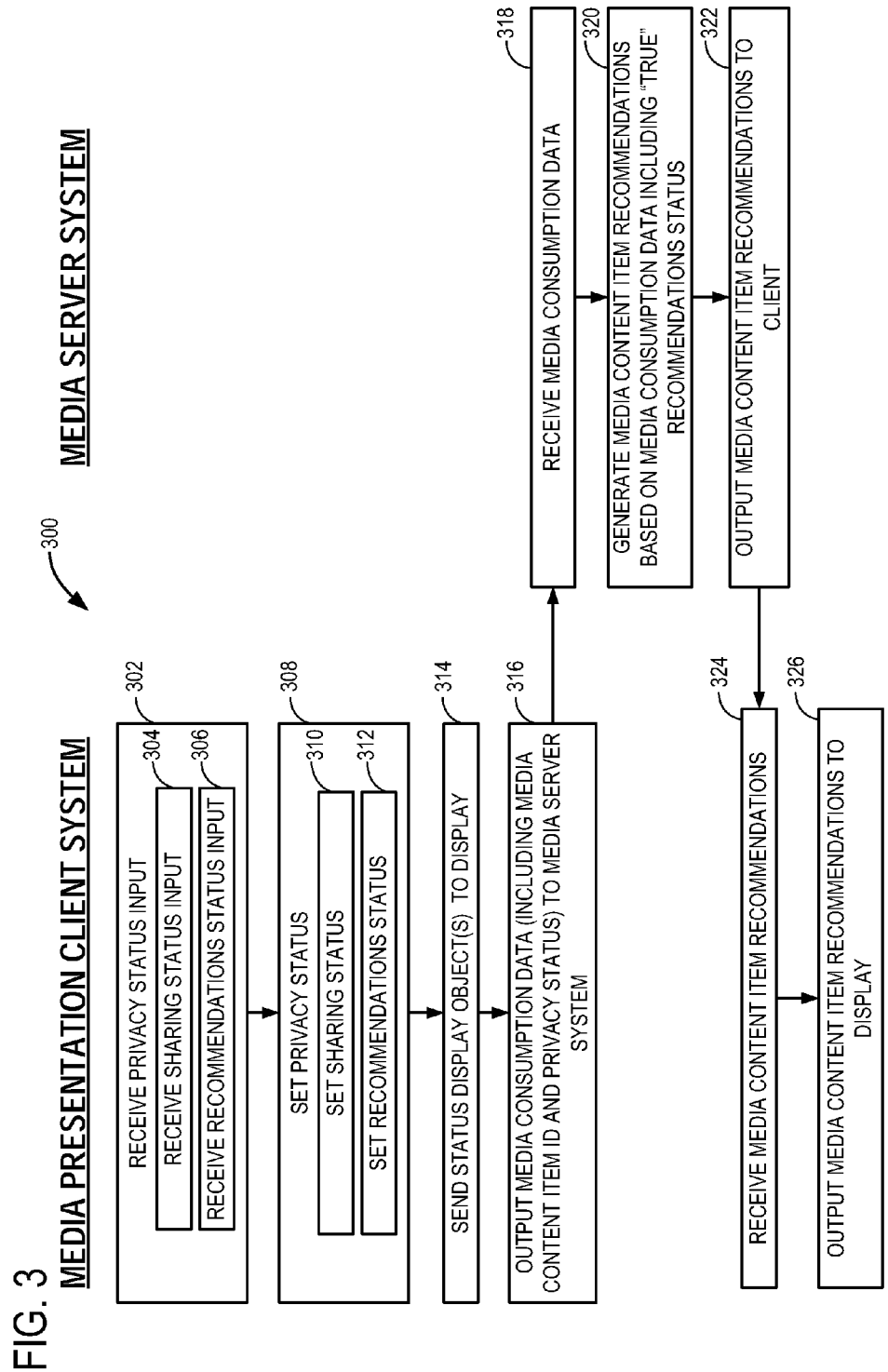
FIG. 3 shows a flowchart illustrating an embodiment of a method for generating media content item recommendations.

Turning now to FIG. 3, a flowchart illustrates an embodiment of a method 300 for generating media content item recommendations. At 302, a media presentation client system (e.g., media presentation client system 202) receives a privacy status input from a user.

In some embodiments, the privacy status may comprise a sharing status, as indicated at 304 where the sharing status input indicates a sharing status associated with a media content item consumed by a user. The sharing status may indicate a private sharing status or a non-private sharing status which respectively indicate a more restrictive sharing of the media consumption data or a less restrictive sharing of the media consumption data with other users connected to the user in a social network. It will be appreciated that the private and non-private sharing statuses described herein are presented for the purpose of example, and that any other suitable set of statuses may be used.

Further, in some embodiments, the privacy status input at 302 may comprise a recommendations status input at 306, where the recommendations status input indicates a recommendations status associated with the media content item. The recommendations status may include, for example, a "true" recommendations status or a "false" recommendations status respectively indicating whether to include or to not include the media consumption data when generating media content item recommendations. It will be appreciated that the "true" and "false" recommendations statuses described herein are presented for the purpose of example, and that other suitable statuses may be used. For example, in some embodiments, a spectrum of more than two recommendations statuses may be used.

Continuing with method 300, at 308, the privacy status is set at the media presentation client system. This may include setting the sharing status at 310, and/or setting the recommendations status at 312. It will be understood that the setting of a privacy status refers to a storage of the privacy status in such a manner that it is associated with the media consumption data for the corresponding media content item.

As described, the sharing status and/or recommendations status can be set for each media content item such that item-by-item control of sharing can be implemented. In another example, a sharing status or recommendations status may indicate a particular time frame during which a requested status is to apply (e.g., a non-private sharing status from 9 am-5 pm on weekdays, a private sharing status for other times). In another example, a sharing status input or a recommendations status input may indicate a desired sharing status or a desired recommendations status for a particular type of media content items (e.g., "true" recommendations status for classical music and "false" recommendations status for pop music).

Although described with respect to a media content item being consumed, it will be appreciated that a sharing status input and/or a recommendations status input also may be received when a user is setting up a recording of one or more media content items. For example, a user may indicate a sharing status input and/or a recommendations status input to be associated with a series of television shows the user is preparing to record. Further, a user may indicate a default sharing status and/or default recommendations status, such that the default status applies to all media content items consumed until changed. Additionally, a user may be provided with granular controls, such that, for example, the user can "increase" or "decrease" a privacy setting (e.g., sharing status) from a default privacy setting (e.g., default sharing status). This may allow a user to share media consumption information with different subsets of other users in the user's social network. Similarly, in some embodiments, a user may be able to indicate several sub-statuses within a sharing status or within a recommendations status.

Continuing with FIG. 2, at 314, the media presentation client system outputs one or more status display objects representative of the privacy status to the display. Accordingly, the one or more status display objects may represent the sharing status and/or the recommendations status. FIGS. 4A-4D show a schematic view of an example user interface that shows current status information via display objects, and by which a user can easily and intuitively provide a sharing status input and/or a recommendations status input. It is to be understood that the example of FIG. 4A-4D is shown for the purpose of illustration, and is not meant to be limiting in any way. For example, a privacy status may be updated in any other suitable manner, such as via a dedicated button on a remote control device, etc.

Figure 4A:
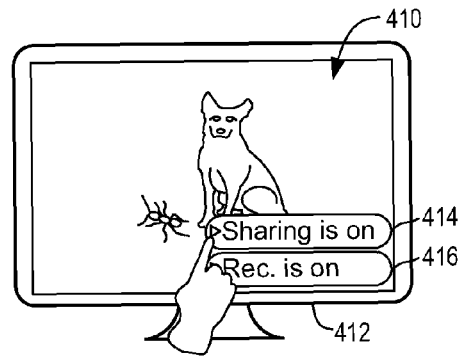
FIG. 4 shows a schematic view of an embodiment of a user interface by which a user can provide status inputs and view status feedback.
Figure 4B:
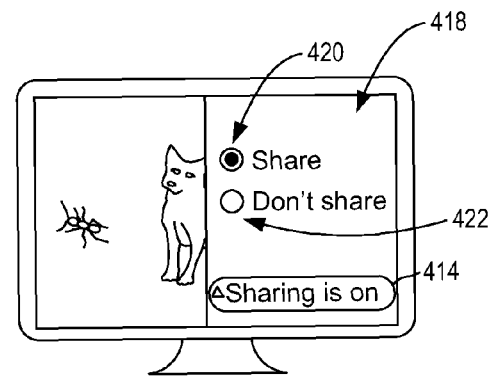

At screen 410 of FIG. 4A, a video (a media content item) is presented on display 412 for a user's consumption. A sharing status icon 414 and a recommendations status icon 416 (e.g., status display objects) are overlaid on the video presentation. In this nonlimiting example, the sharing status icon 414 graphically represents a sharing status associated with the video currently being consumed by the user. As indicated by sharing status icon 414 ("Sharing is on"), the current sharing status associated with the video being consumed is a non-private sharing status. That is, friends of the user are allowed to access information related to the user's consumption of the video.

The recommendations status icon 416 graphically indicates "Recommendations is on", reflecting that the recommendations status associated with the video currently being consumed includes a "true" recommendations status. That is, the video may be used, by a media content item recommendations program, to generate media content item recommendations.

Figure 4C:
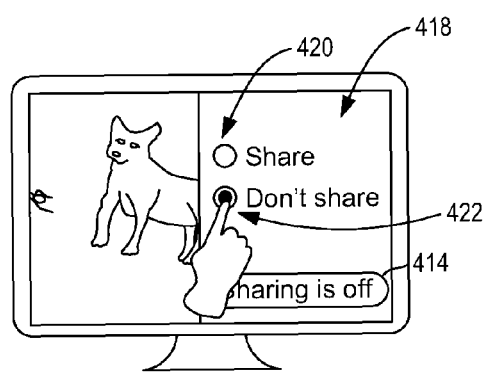
Figure 4D:
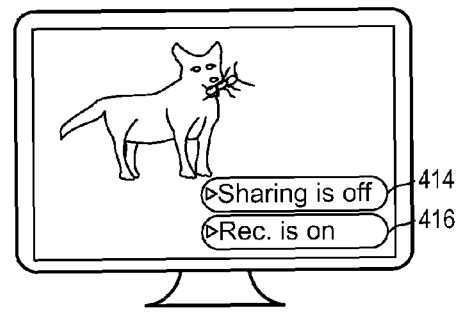

If a user wishes to change the sharing status or recommendations status, the user can indicate selection of the sharing status icon 414 via touch or mouse cursor input, as some examples. User selection of the sharing status icon 414 at screen 410 causes the screen at FIG. 4B to be presented. Here, a sharing pane 418 is overlaid on the video presentation including radio button 420 indicating a current sharing status. The user provides a sharing status input by selecting radio button 422 of sharing pane 418, thereby causing the presentation of the screen at FIG. 4C. In this case, as shown at FIG. 4C, selection of radio button 422 causes an automatic deselection of the radio button 420 and text of the sharing status icon 414 is updated to reflect the user's selection ("Sharing is off"), and the sharing status is updated in the media consumption data for the media content item being consumed (e.g., the video). Actuation of the sharing status icon 414 at the screen shown at FIG. 4C causes the sharing pane 418 to be hidden, and the screen at FIG. 4D to be presented. At FIG. 4D, the change in the sharing status is reflected by the text description of the sharing status icon 414 (e.g., "Sharing is off"). As depicted, a user may easily view a privacy status (e.g., a sharing status and/or a recommendation status) for a media content item being consumed, and also may make status changes without accessing a user profile.

In this example, the user can similarly select the recommendations status icon 416 and be presented with options to provide a recommendations status input. Upon receipt of a recommendations status input by the user, the recommendations status can be set, and the recommendations status icon can be updated to reflect the recommendations status.

It will be appreciated that the sharing status icon 414 and the recommendations status icon 416 are shown for the purpose of example, and are not intended to be limiting in any manner, as any suitable representation of the sharing status or the recommendations status, including one or more of graphics (e.g., avatars), text, voice-over, etc. may be used.

Turning back to FIG. 3, media consumption data for each media content item that is consumed is output to the media server system (e.g., media server system 212) at 316. As mentioned above, the media consumption data may include a media content item identifier, a user identification, and/or a privacy status including one or more a sharing status and a recommendation status. The media content item identifier may indicate a type of media content item and/or an identity of the media content item. As a specific example, a media content item identifier for a video may indicate that the video is a television show of a particular genre, and may also indicate a particular episode of the television show was consumed. The media consumption data also may include any other type of data related to the consumption of the media content item, such as a time of consumption, a duration of consumption, etc.

At 318, the media server system receives the media consumption data for the media content item. It will be appreciated that the media server system can receive media consumption data in real-time (e.g., as the media content items are consumed), periodically (e.g., via daily synchronization, after a certain number of media content items have been consumed, etc.), or in any other suitable manner.

At 320, the media server system (e.g., a media content item recommendations program executable on the media server system) generates media content item recommendations for the user based on media consumption data for media content items that comprise a "true" recommendations status. As described above, the generating of media content item recommendations may include excluding media consumption data that include a "false" recommendations status. The generation of such recommendations may be triggered in any suitable manner. For example, recommendations may be generated when a user first starts a media consumption session, when a user initiates a media discovery process during consumption, etc.

Next, at 322, media content item recommendations are output from the media server system to the media presentation client, which receives the recommendations at 324. Then, at 322, the media presentation client system outputs the one or more media content item recommendations to the display.

Figure 5:
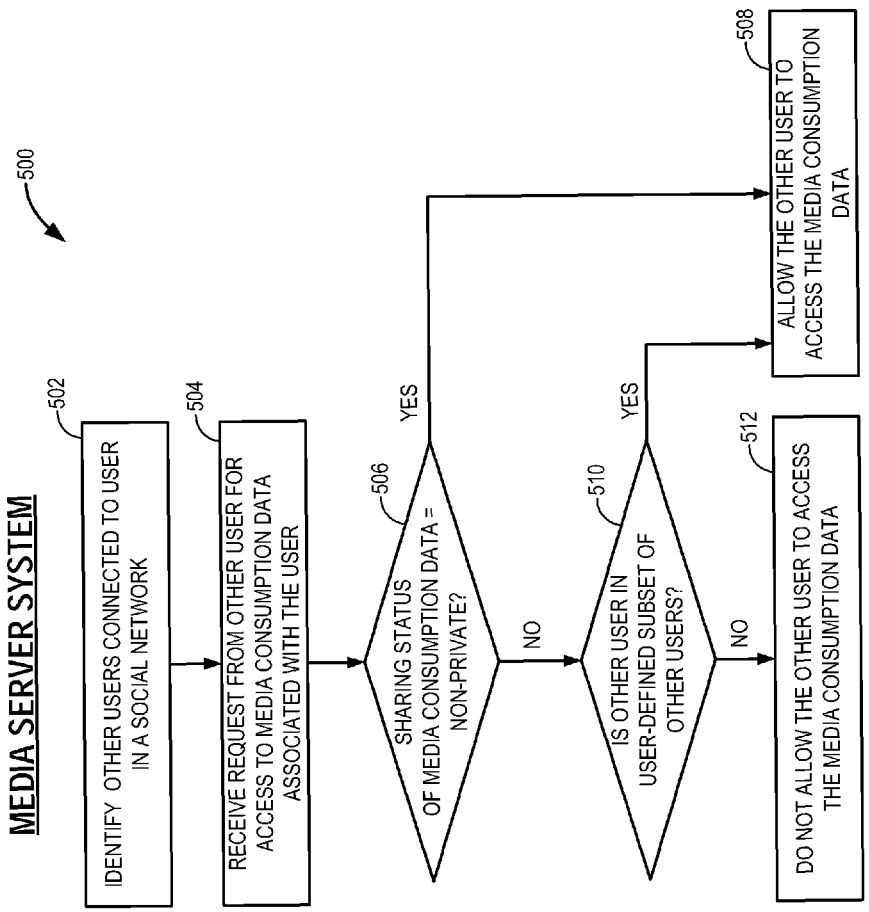
FIG. 5 shows a flowchart illustrating an embodiment of a method for providing other users with access to media consumption data.

As mentioned above, in some embodiments, media consumption data for a user may be accessed by other users, such as other users in the user's social network, if the user desires to share such information. Accordingly, FIG. 5 shows a flowchart illustrating an example method for providing other users with access to a user's media consumption data.

At 502, method 500 includes identifying other users connected to the user in a social network, such as social network 230 that are allowed access to media consumption data that include a non-private sharing status, and/or identifying such other users connected to the user in the social network that are not allowed access to media consumption data with a private sharing status. Such identification may comprise, for example, receiving a user input adding another user to the social network, receiving a user input specifying a subset of other users in the social network that can access media consumption data with a private sharing status, etc.

Next, at 504, the media server system receive a request from one of the other users for access to the user's media consumption data for a selected media content item. Such a request from another user may take any suitable form. For example, the request may comprise a request to navigate to the user's webpage or to a user's profile of a social networking application, for example.

At 506, it is determined if the media consumption data requested by the other user has a non-private sharing status. Such a non-private sharing status may indicate that all other users connected to the user in a social network are allowed access to that media consumption data, may indicate that a subset of other users are allowed access that media consumption data, or may indicate any other suitable status. If the sharing status is determined to be non-private, the other user is allowed access to the media consumption data for that media content item at 508.

On the other hand, if the answer is no at 506, and the sharing status is private, then method 500 proceeds to 510 to determine if the other user is included in a user-defined subset of other users that are allowed access to media consumption data having the private sharing status. If the answer is yes at 510, the other user is allowed access to the media consumption data at 508. On the other hand, if the answer is no at 510, the media server system does not allow the other user access to the media consumption data, as indicated at 512.

As mentioned above, a user may wish to retroactively change a privacy status, such as a sharing status or a recommendations status, of a media content item that the user previously consumed. As just one example, a user may forget to provide a sharing status input or a recommendations status input, or may inadvertently provide an undesired sharing status input or an undesired recommendations status input during consumption of a media content item (e.g. when another family member, such as a child, is viewing media content). As such, in some embodiments, a user may be allowed to retroactively correct the privacy status (e.g., the sharing status or recommendations status).

Figure 6:
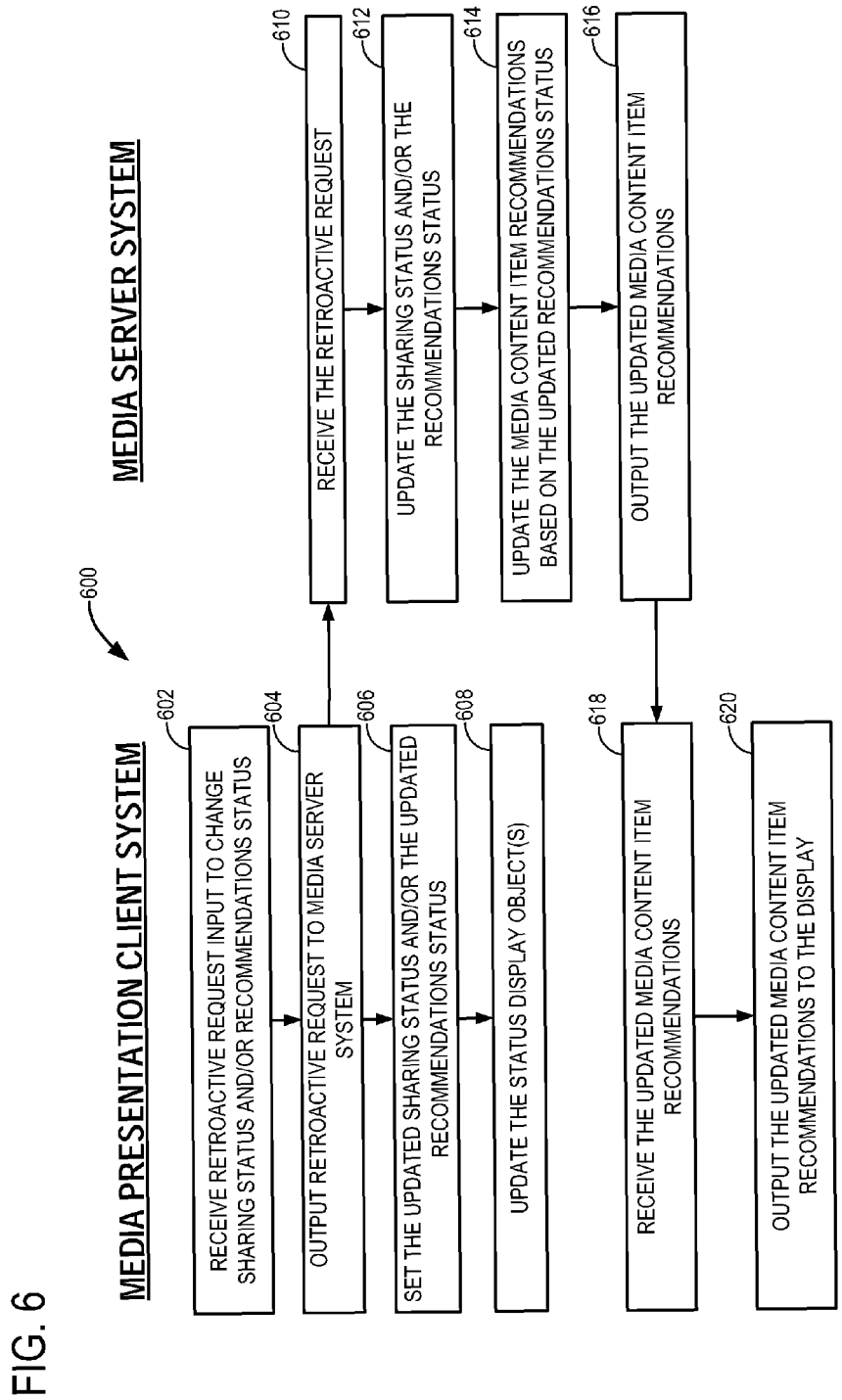
FIG. 6 shows a flowchart illustrating an embodiment of a method for retroactively changing a status of a media content item.

An example of such a retroactive change is described with respect to method 600 shown at FIG. 6. At 602, the media presentation client system receives, from the user, an input of a retroactive request to change one or more of the sharing status and the recommendations status of media consumption data for a selected previously consumed media content item. For example, a user may wish to change a recommendations status of media consumption data for one or more media content items to include the "false" recommendations status and media consumption data for one or more other media content items to include the "true" recommendations status, after viewing media content item recommendations. At 604, the media presentation client system then outputs, to the media server system, the retroactive request including one or more of an updated sharing status and an updated recommendations status for the selected previously consumed media content item.

In cases where a sharing status and/or a recommendations status are locally stored at a client, the client may also set the updated sharing status and/or the updated recommendations status indicated by the retroactive request, as indicated at 606. Further, the client may update the status display objects to represent the one or more of the updated sharing status and the updated recommendations status at 608 to provide visual feedback to the user.

At 610, the media server system receives the retroactive request from the client. Then, at 612, the sharing status and/or the recommendations status of the media consumption data for the selected previously consumed media content item are updated at the media server system.

At 614, if the request includes an updated recommendations status, the media server system may update the media content item recommendations based on the updated recommendations status. This updating may occur automatically (e.g. where the retroactive request was sent in response to a previous recommendations output), or may occur upon a next triggering event for the generation of recommendations. The updated media content item recommendations are output to the media presentation client system at 616, and are accordingly received at the media presentation client system at 618. Then, the updated media content item recommendations are output to a display at 620 for a user's review. In some cases, the user may receive a notification along with the updated media content item recommendations indicating particular media content items that will now influence or not influence media content item recommendations, based on the retroactive request.

Figure 7:
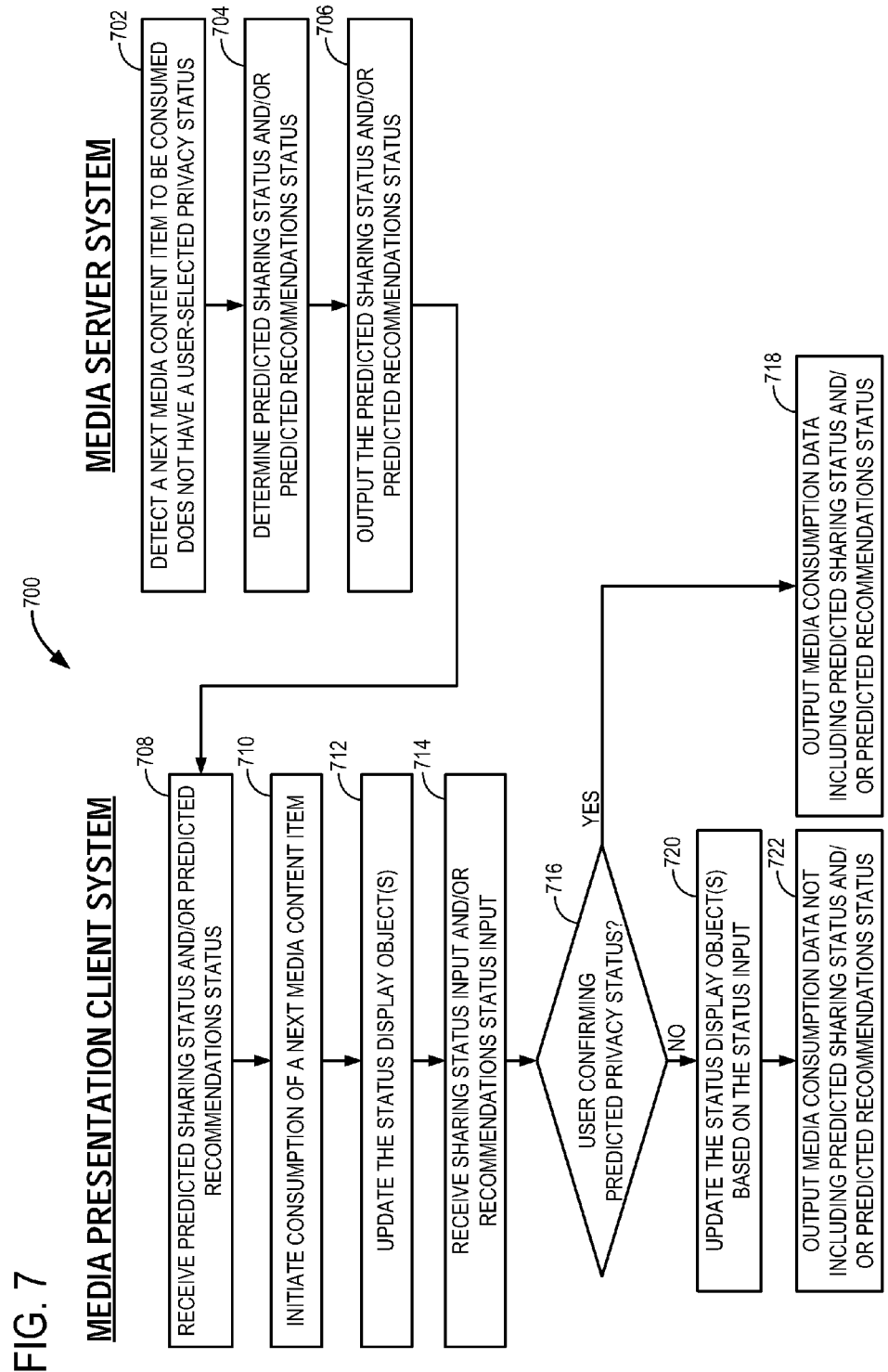
FIG. 7 shows a flowchart illustrating an embodiment of a method for setting a predicted status.

In some embodiments, a media server system may be configured to recognize patterns related to a user's privacy status selections over a period of time, or over a volume of consumption. Thus, the media server system may be configured to predict a user's sharing status and/or recommendations status for a next media content item. Turning now to FIG. 7, an example method 700 for setting a predicted status is illustrated.

First, at 702, the media server detects that a next media item that may be consumed by the user does not have one or more user-selected privacy statuses (e.g., a sharing status, a recommendations status). Then, at 704, the media server system determines a predicted privacy status for the next media content item, such as a predicted sharing status and/or a predicted recommendations status. It will be understood that the media server may determine, or generate, a predicted privacy status for any media content items that are available for future viewing and that do not include user-selected privacy statuses, for example.

The predicted privacy statuses may be determined based upon any suitable criteria. For example, a predicted sharing status may be determined based on a frequency with which previously collected media consumption data includes a particular sharing status in association with a particular media content item identifier. If a user frequently sets the sharing status non-private while watching television, but frequently sets the sharing status to private while watching movies, the predicted sharing status for a next media content item related to television may include the non-private sharing status whereas the predicted sharing status for a next media content item related to movies may include the private sharing status. As a more specific example, if a user frequently sets the sharing status to include a private sharing status while watching a competitive dancing television show, the predicted sharing status for a next viewing of the competitive television show may include the private sharing status. It will be understood that such predictions may be based on any suitable media consumption data, including but not limited media content item ratings, genres, broadcast times, actors/directors/producers, etc.

A predicted recommendations status may be based on a frequency with which previously collected media consumption data includes a particular recommendations status in association with a particular media content item identifier. For example, if a user frequently sets the recommendations status to include the "true" recommendations status for a first style of music and frequently sets the recommendations status to include the "false" recommendations status for a second style of music, the predicted recommendations status for media content items related to the first style of music may include the "true" recommendations status whereas the predicted recommendations status for media content items related to the second style of music may include the "false" recommendations status. It will be understood that such predictions may be based on any suitable media consumption data, including but not limited to media content item ratings, genres, broadcast times, actors/directors/producers, etc.

At 706, the predicted sharing status and/or predicted recommendations status is output from the media server system to the media presentation client system. At 708, the media presentation client system receives and sets the one or more of the predicted sharing status and the predicted recommendations status. Next, at 710, consumption of a next media content item (e.g., associated with a particular media content item identifier) is initiated at the media presentation client system. At 712, the media presentation client system may automatically update the one or more status display objects to represent the one or more of the predicted sharing status and the predicted recommendations status, so that a user can be made aware of the predicted sharing status and/or the predicted recommendations status. In other cases, the status display object(s) may be semi-automatically updated, such that a user is notified of a predicted privacy status and can provide input to accept or reject the predicted privacy status.

It will be understood that a user may be allowed to accept or reject a predicted privacy status. For example, at 714, the media presentation client system may receive from the user a sharing status input indicating a sharing status for the media content item and/or a recommendations status input indicating a recommendations status for the media content item. Then, at 716, it is determined if the user is confirming or rejecting the predicted sharing status and/or predicted recommendations status. In some cases, this may include determining if the sharing status input and/or recommendations status input is the same as the status indicated by the status input received from the user.

If the answer is yes at 716, the media presentation client system maintains the predicted sharing status and/or recommendations status, and thus may output the media consumption data including the predicted sharing status and/or the predicted recommendations status at 718. However, if the answer is no at 716, the media presentation client system does not maintain the predicted sharing status and/or recommendations status. Therefore, at 720, the method 700 includes updating the status display object(s) to represent the privacy statuses associated with the status input received. At 722, the media presentation client system may output media consumption data that does not include the predicted sharing status and/or predicted recommendations status but, rather, includes the statuses indicated by the status input received from the user at 714.

Although the sharing status and recommendations status are described herein as independent statuses, it will be appreciated that, in other examples, the recommendations status may be dependent on the sharing status, and/or vice versa. As such, a predicted recommendations status may be based on a sharing status, or a predicted sharing status may be based on a recommendations status.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A media server computer system for controlling access to media consumption data, the media server system comprising:
    an electronic logic subsystem comprising a processor configured to execute instructions; and
    an electronic data-holding subsystem comprising memory holding the instructions, the instructions executable by the logic subsystem to:
        receive, from a client device associated with a user, media consumption data having, for each of a plurality of media content items consumed on the client device, a media content item identifier that identifies the item consumed and an item-specific privacy status, the item-specific privacy status including an item-specific recommendations status, the item-specific recommendations status comprising a true item-specific recommendations status or a false item-specific recommendations status;
        receive, from a media content recommendations program, a request for access to the media consumption data,
        for each media content item having a "true" item-specific recommendations status, provide the media content recommendations program access to the media consumption data for that item, and
        for each media content item having a "false" item-specific recommendations status, not provide the media content recommendations program access to the media consumption data for that item.

2. The media server system of claim 1, where the item-specific privacy status further comprises
    a sharing status indicating whether information regarding consumption of the selected media content item can be shared with other users of the media server system.

3. The media server system of claim 2,
    where the instructions are further executable to receive a request to access the media consumption data from another user, the other user being connected to the user in a social network, and
    to provide the other user with access to the media consumption data based on a determination that the sharing status is non-private.

4. The media server system of claim 2, where the instructions are executable to:
    determine a predicted sharing status for a next media content item based on previously collected media consumption data; and
    output the predicted sharing status to a client along with the next media content item.

5. The media server system of claim 1, where the instructions are further executable to:
    receive, from a client, a retroactive request to change the item-specific recommendations status for a selected previously consumed media content item,
    in response, update the item-specific recommendations status in the media consumption data for the selected previously consumed media content item,
    update the item-specific recommendations status to form updated item-specific recommendations statuses, and
    output the updated item-specific recommendations statuses to the client.

6. The media server system of claim 5, where the item-specific privacy status further comprises a sharing status indicating whether information regarding consumption of the selected media content item can be shared with other users of the media server system, and where the instructions are executable to:
    receive, from the client, a retroactive request to change the sharing status for the selected previously consumed media content item, and
    in response, update the sharing status in the media consumption data for the selected previously consumed media content item.

7. The media server system of claim 1, where the instructions are executable to:
    determine a predicted item-specific recommendations status for a next media content item based on previously collected media consumption data, and
    output the predicted item-specific recommendations status to a client along with the next media content item associated with the media content item identifier.

8. The media server system of claim 1, wherein the client device is one of a plurality of client devices associated with the user, and wherein the instructions are further executable to receive and aggregate the media consumption data from each of the plurality of client devices.

9. The media server system of claim 1 wherein, the media consumption data includes, for each of the plurality of media content items consumed, a data type related to consumption of that media content item, and wherein the data type includes one or both of a time of consumption and a duration of consumption.

10. A media presentation client computing system comprising:
   a display;
   an electronic logic subsystem comprising a processor configured to execute instructions; and
   an electronic data-holding subsystem comprising memory holding the instructions, the instructions executable by the logic subsystem to:
      receive for a user associated with the client computing system an input of a sharing status, the sharing status indicating a private or non-private sharing status to associate with a media content item consumed on the client computing system,
      receive for the user an input of a recommendations status indicating a "true" or "false" recommendations status to associate with the media content item consumed, the recommendations status being "true" if a media content item recommendations program is to be given access to media consumption data for that item and "false" if the media content item recommendations program is to not be given access to the media consumption data for that item,
      send to the display one or more status display objects representative of the sharing status and the recommendations status,
      send the media consumption data including the sharing status, the recommendations status, and a media content item identifier to a media server, the media content item identifier identifying the media content item consumed,
      receive from the media server one or more media content item recommendations,
      output to the display the one or more media content item recommendations,
      receive from the user an input of a retroactive request to change one or more of the sharing status and the recommendations status of the media consumption data pursuant to media being consumed on the client computing system not by the user,
      send to the media server the retroactive request including one or more of an updated sharing status and an updated recommendations status for the media consumption data,
      receive from the media server updated media content item recommendations responsive to sending of the retroactive request, and
      output the updated media content item recommendations to the display.

11. The media presentation client system of claim 10, where the instructions are further executable to:
   receive from a media server one or more of a predicted sharing status and a predicted recommendations status for a next media content item, and
   upon initiation of consumption of the next media content item,
      update the one or more status display objects to represent the one or more of the predicted sharing status and the predicted recommendations status.

12. The media presentation client system of claim 10, where the non-private sharing status indicates a set of other users connected to the user in a social network that are allowed access to media consumption data for the media content item consumed by the user.

13. The media presentation client computing system of claim 10, wherein the instructions are further executable to assign the "false" recommendations status for media content received at the client computing system and consumed not by the user.

14. A computer-readable memory device, the computer-readable memory device comprising instructions executable by a media-server computing device to:
   receive, from a client device associated with a user, media consumption data having, for each of a plurality of media content items consumed on the client device, a media content item identifier that identifies the item consumed, and a "true" or "false" item-specific recommendations status, the item-specific recommendation status indicating whether an associated media content item is useable to generate media-content recommendations,
   generate media content item recommendations for the user based on the media consumption data for items associated with a "true" recommendations status, and not for items associated with a "false" recommendations status,
   output the media content item recommendations to the client device,
   receive, from a client, a retroactive request to change the recommendations status in media consumption data for a selected previously consumed media content item,
   in response, update the recommendations status in the media consumption data for the selected previously consumed media content item,
   update the media content item recommendations in response to the update of the recommendations status, and
   output the updated media content item recommendations to the client device.

15. The computer-readable memory device of claim 14, wherein the instructions are further executable to:
   generate a predicted recommendations status for a next media content item associated with a particular media content item identifier based on previously collected media consumption data including a particular recommendations status and the particular media content item identifier, and
   output the predicted recommendations status to a client for the next media content item.

16. The computer-readable memory device of claim 14, wherein the media consumption data for each media content item further comprises a sharing status including a private sharing status or a non-private sharing status which respectively indicate a more restrictive sharing of the media consumption data or a less restrictive sharing of the media consumption data with other users connected to the user in a social network, and wherein the computer-readable memory device has further instructions to:
   provide one or more of the other users with access to media consumption data comprising the non-private sharing status.

17. The computer-readable memory device of claim 16, wherein the instructions are further executable to:
  generate a predicted sharing status for a next media content item associated with a particular media content item identifier based on previously collected media consumption data including a particular sharing status and the particular media content item identifier, and
  output the predicted sharing status to the client device.

* * * * *